July 26, 1960 O. G. FERM 2,946,558
APPARATUS FOR FEEDING WIRES INTO CONDUITS
Filed Aug. 30, 1956 4 Sheets-Sheet 1

INVENTOR.
Olaf G. Ferm
BY *Struhlwells*
Atty.

July 26, 1960  O. G. FERM  2,946,558
APPARATUS FOR FEEDING WIRES INTO CONDUITS
Filed Aug. 30, 1956  4 Sheets-Sheet 2
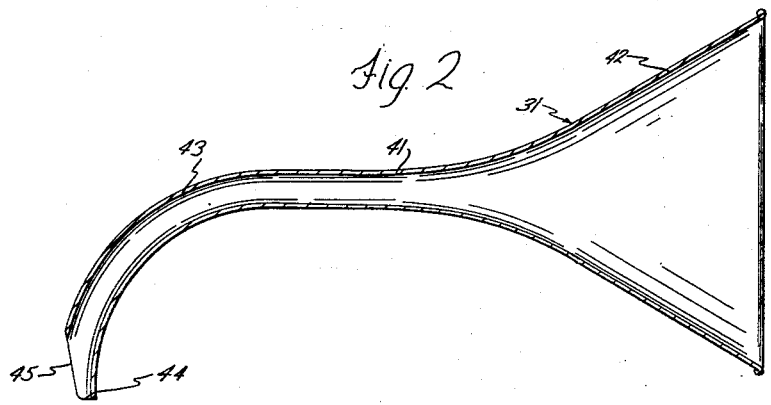
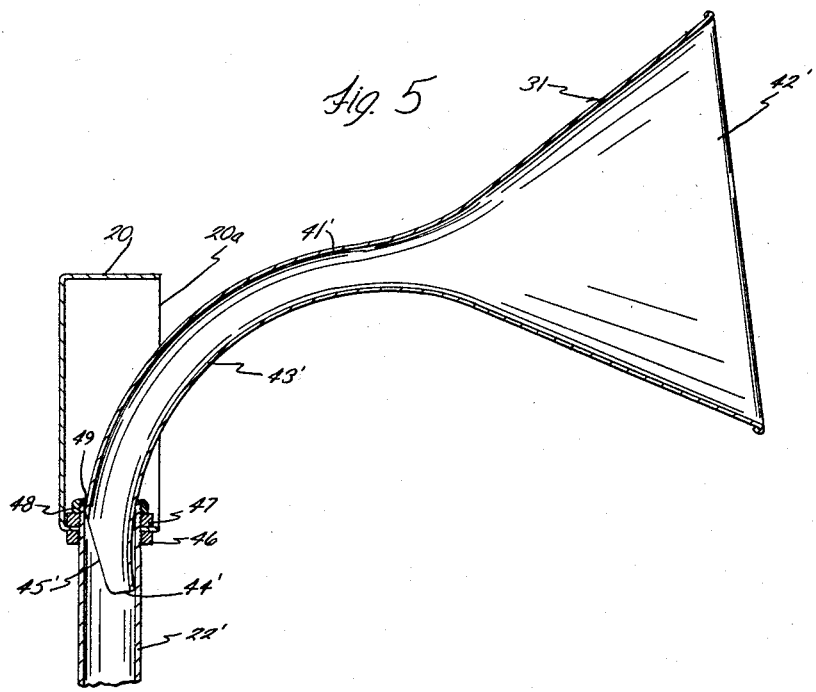
INVENTOR.
Olaf G. Ferm
BY Studwells
Atty.

July 26, 1960 O. G. FERM 2,946,558
APPARATUS FOR FEEDING WIRES INTO CONDUITS
Filed Aug. 30, 1956 4 Sheets-Sheet 3

INVENTOR.
Olaf G. Ferm
BY
Atty.

July 26, 1960 O. G. FERM 2,946,558
APPARATUS FOR FEEDING WIRES INTO CONDUITS
Filed Aug. 30, 1956 4 Sheets-Sheet 4

INVENTOR.
Olaf G. Ferm
BY
Atty.

United States Patent Office 2,946,558
Patented July 26, 1960

2,946,558
APPARATUS FOR FEEDING WIRES INTO CONDUITS

Olaf G. Ferm, 2708 W. Boone, Spokane, Wash.

Filed Aug. 30, 1956, Ser. No. 607,149

3 Claims. (Cl. 254—134.3)

The present invention relates to improvements in apparatus for feeding electrical conductors into conduits connected to electrical connection boxes such as junction boxes, outlet boxes and the like.

In installing electrical systems which include metallic conduit connected between the various electrical connection boxes of the system and surrounding the electrical conductors, the accepted method of installation comprises first constructing the complete system of connection boxes with conduit extending therebetween, then threading the required electrical conductors between the several boxes inside the conduit, and finally connecting the various electrical appliances such as light fixtures, switches, outlets and the like to the conductors to complete the system. To thread the electrical conductors through the conduit sections, electricians force a stiff steel tape commonly known as a "fish wire" or "fish tape" through a section of conduit between two connection boxes, secure the conductors to be installed in the conduit section to the tape, and then retrieve the tape, pulling the conductors through the conduit section. Since the conduit sections are relatively small in diameter, and since they are frequently connected to the connection boxes at right angles to the open sides of the connection boxes, the threading procedure has heretofore presented a difficult problem. The electrical conductors, normally being solid extruded wires rather than stranded or braided wires, resist bending and do not readily flex the amount required to traverse the right angle turn between the box opening and the conduit connection. Also, these conductors are normally provided in the form of rolls and tend to maintain a spiral form when removed for use. When threading the wires into the conduit sections care must also be taken to insure that the insulation surrounding each conductor is not damaged or scraped off by rubbing the conductors against the relatively sharp edges of the connection box walls and conduit end openings. In threading conductors into conduit sections, it has heretofore been necessary to utilize the services of two electricians, one to pull the conductors through the conduit, and the second to guide and feed the conductors into the conduit. Even with the services of the second electrician to guide and feed the conductors into the pipe, the process has not been entirely satisfactory and occasional damage is caused to the conductor insulation coating.

It is the principal purpose of the present invention to provide apparatus for feeding electrical conductors into conduits connected to electrical connection boxes which will eliminate the necessity of an electrician to guide and feed the conductors into the conduit and which will operate to guide and feed the conductors from coils, packages or spools into the conduit, and to protect the conductors against scraping or snarling.

A further purpose of the invention is to provide such apparatus which will guide the conductors into conduit openings spaced at right angles to the openings in the connection boxes to which they are attached, through the widest possible curve whereby to permit a minimum pulling effort on the part of the electrician threading the conductors.

The nature and advantage of the invention will appear more clearly from the following description and the accompanying drawings wherein a preferred form of the invention is shown. It should be understood, however, that the description and drawings are illustrative only, and are not intended to limit the invention except insofar as it is limited by the claims.

In the drawings:

Figure 2 is an enlarged vertical sectional view illustrating one of my improved wire feeding tubes;

Figure 5 is a cross sectional view of an electrical connection box, but showing a tube of somewhat larger diameter in place;

Figure 1:
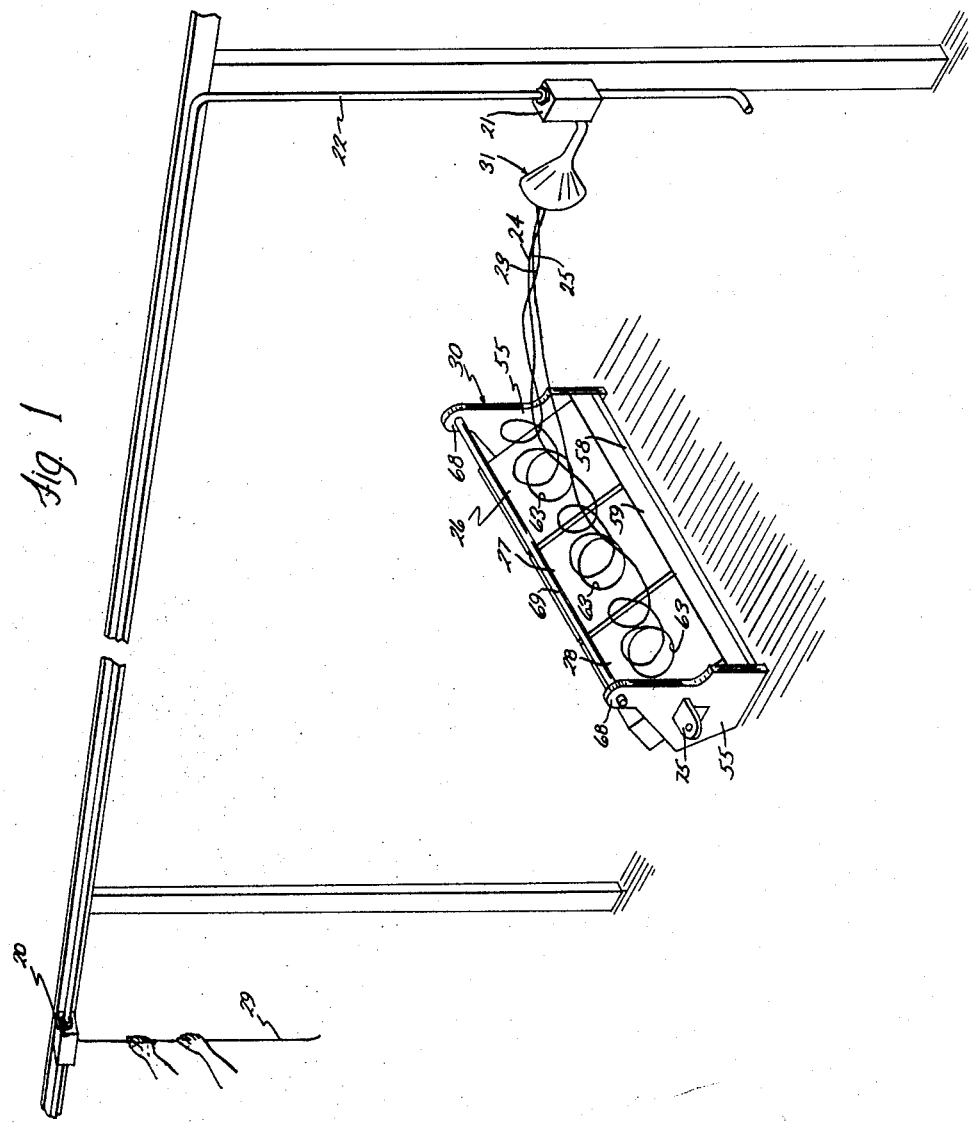
Figure 1 is a perspective view of a portion of an electrical wiring system of the type including metal conduit connecting the several connection boxes, illustrating my improved feeding apparatus in operation.

Referring now to the drawings, I have shown in Figure 1 a portion of a building unit having an electrical conduit system installed therein and ready for the insertion of conductors. The conduit system includes a number of connection boxes such as those indicated at 20 and 21, the boxes being interconnected by conduit sections such as that shown at 22. In order to complete this portion of the electrical system of the building unit, it is necessary to install in the conduit section 22, a plurality of conductors such as 23, 24 and 25. The conductors 23, 24 and 25 are shown as packaged in boxes 26, 27 and 28, each conductor 23, 24 and 25 being carried in its box in coiled form.

To install the wires 23, 24 and 25, in the conduit 22 according to the heretofore common method, it was necessary to station an electrician at each of the boxes 20 and 21, the electrician at the box 20 handling the fish tape shown at 29 in Figure 1, and a second electrician at box 21 to pull the conductors 23, 24 and 25 from their packages 26, 27 and 28 and feed them into the conduit opening.

To install the wires 23, 24 and 25 in the conduit 22 according to my invention, the second electrician at box 21 is not required. In his place I provide a wire holding rack 30 which receives the packages 26, 27 and 28 and holds them in proper position to feed wire into the conduit 22, and a wire feeding tube 31 which receives the conductors 23, 24 and 25 from the rack 30, smooths the bends therefrom, and guides them smoothly into the conduit 22. The rack 30 comprises a pair of end supports 55 that carry a package holding tray therebetween which has a bottom member 58 and a front member 59. The packages 26, 27 and 28 have apertures 63 through which the wire is drawn out. The end supports 55 of the rack 30 have upstanding ears 68 that mount a handle 69. A bracket 75 may be provided on the end support 55 to mount the feeder tube 31.

Figures 2, 3, 4 and 5 show in detail, the construction and operation of the feeding tube 31. In electrical systems such as that partially disclosed in Figure 1, the combinations of conduit and connection boxes vary considerably in different parts of the system, depending upon the objects to be accomplished. The connection boxes, are of two main types, the first being outlet or switch boxes such as the box 21, and the second being junction boxes such as the box 20. Depending upon the location of a particular box of either type, the conduit 22 may be connected to any of the walls thereof. When the conduit is connected to any of the walls extending perpendicular to the wall having the box entrance therein, the wires being fed thereto during the wire threading operation must make a 90 degree turn from the box entrance in the front wall to the conduit connection.

Figure 3:
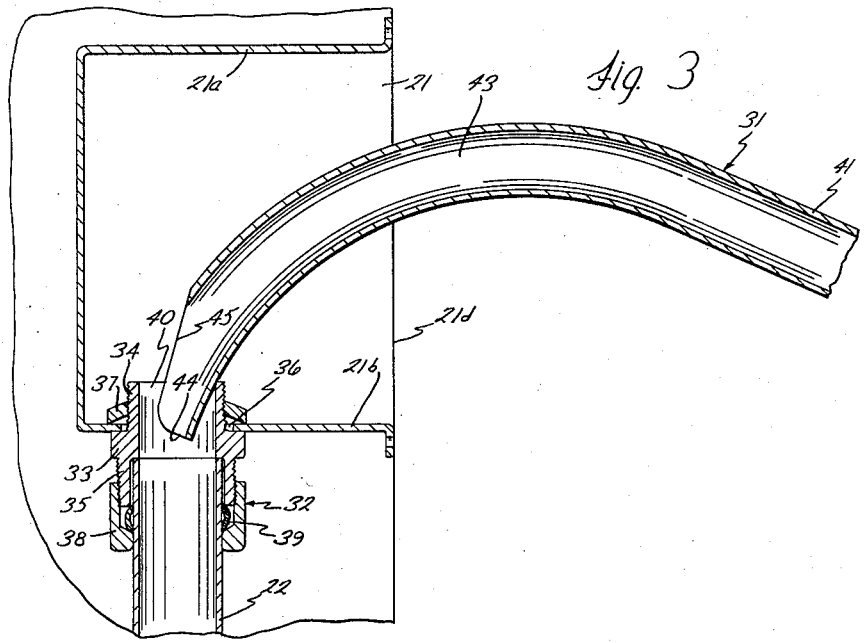
Figure 3 is an enlarged fragmentary vertical sectional view of an electrical outlet connection box illustrating the manner in which my feeding tube is inserted.
Figure 4:
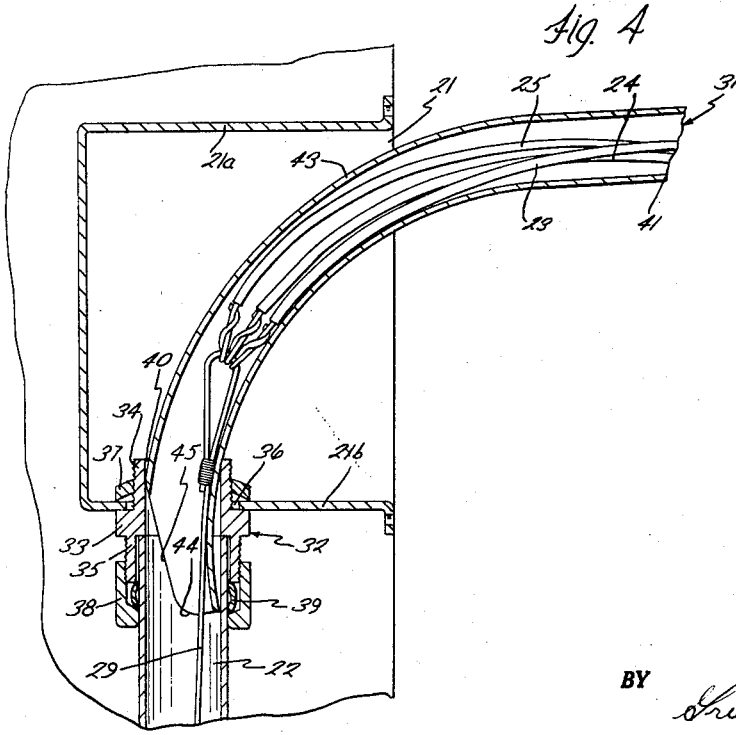
Figure 4 is a view similar to Figure 3, but showing the feeding tube in place.

Figures 3 and 4 illustrate a typical switch box 21 and conduit connection therefor. As shown in these figures, the conduit 22 enters the box 21 through the bottom wall thereof. The conduit 22 is secured to the box 21 by a conduit connector 32. The connector 32 comprises a nut 33 having thereon two oppositely extending externally threaded sleeve portions 34 and 35. The sleeve portion 34 extends into the box 21 through an opening 36 in the bottom wall and is secured in place by a nut 37. The remaining sleeve 35 receives the conduit 22. A jam nut 38 having a split gripping sleeve 39 therein, clamps the conduit 22 to the sleeve portion 35. The connector 32 provides a circular opening 40 spaced a short distance inwardly of the wall of the box 21 into which the wires 23—25 must be fed from the entrance of the box 21.

My improved feeding apparatus is well adapted for guiding wires into the opening 40. The tube 31 is adapted to guide a plurality of wires that have originally been coiled, into the conduit opening 40 in such a way that the wires do not kink, nor have their insulation jackets damaged and so that they move smoothly from the boxes in which they are purchased. The rack 30 cooperates with the guide tube 31 to accomplish these results without attention, once the tube is in place and the wires are attached to the fish tape 29. The tube 31 is so constructed that it is readily insertable into the opening 40 and will remain there without clamps or auxiliary fasteners of any kind. To this end, the tube construction comprises an elongated tube section 41 of a diameter slightly smaller than the inside diameter of the conduit 22, and having one end thereof flared as at 42 to the form of a funnel. The tube section 41 has a curved portion 43 therein which extends through an arc of 90 degrees whereby to dispose the small end 44 of the tube section at right angles to the flared end 42. With this construction it is possible to insert the small end 44 of the tube section 41 into the conduit opening 40 while the flared end 42 faces outwardly. In order to provide for smooth movement of the wires through the tube section 41, and to provide for a minimum pulling effort to accomplish the threading of the wires into the conduit 22, the curved section 43 must curve in as large a radius as possible, and still fit into the box 21. To provide for a maximum radius in the curved section 43, while at the same time insuring easy insertion of the end 44 into the opening 40, the end 44 of the tube section 41 is bevelled or bias cut as shown at 45. This construction provides a reduced tip at the end 44 without reducing the diameter of the tube section 41, and allows the end 44 to be inserted in the opening without being axially aligned thereabove, as is shown in Figure 3. Without this novel bevel 45 it would be necessary to insert the feeding tube 31 into the box 21 so that the end 44 would be axially aligned above the opening 40, in order to fit the end 44 into the opening 40. This, of course, would mean that the radius of curvature of the curved portion 43 would have to be less than the distance from the opening 40 to the top wall 21a of the box 21. As is clearly shown in Figures 3 and 4, the bevel 45 allows insertion of the feeding tube 31 while the radius of the portion 43 is considerably larger than the total distance between the top wall 21a and the bottom wall 21b of the box 21.

The end 44 of the tube section 41 of the feeding tube 31 is adapted to be inserted into the conduit 22 for a substantial distance as shown in Figure 4. The tube section 41 is secured in place by frictional engagement with the conduit 22 and the connector 32. When the end 44 has been inserted into the conduit 22 far enough to position the bevel 45 entirely within the conduit 22, the tube wall at the inward extremity of the bevel 45 engages the conduit 22 and wedges the tube section 41 over until the end 44 and the curved portion 43 adjacent the opening 40 frictionally engage the conduit 22 and connector 32 producing a three point contact to hold the feeding tube 31 securely in place.

In normal operation, the electrician using the feeding tube 31 will, when fitting the tube 31 in place, exert enough force so that the wedging action of the tube wall at the inward extremity of the bevel 45 will cause the end 44 to be sprung slightly, thus producing a tight grip at the three points of contact between the tube section 41 and the conduit 22.

While I have shown in Figures 2, 3 and 4, a feeding tube 31 of dimensions suited for insertion into a conduit section 22 connected to a switch or outlet box 21, it should be understood that my invention is not limited to use with that particular combination. Conduits of several sizes are used in conventional wiring systems, so I provide feeding tubes of varying dimensions to fit the different sizes of conduit. Figure 5 illustrates a feeding tube 31' suited for use with a large size conduit 22'. As shown in Figure 5, the conduit 22' is connected to a junction box 20. The conduit 22' is shown as threaded and having two nuts 46 and 47 thereon which secure it to the box 20, this being a standard connection method for large sizes of conduit. A bushing 48 is also provided to provide a smooth opening 49 into which wires may be fed. The feeding tube 31' is constructed in the same manner as the feeding tube 31 and comprises a tube section 41' having a flared end 42', a curved portion 43' terminating in an end 44', having a bevelled portion 45'. Comparison of the feeding tube 31' with the tube 31 of Figure 2, will show that the curved portion 43' of the feeding tube 31' has a somewhat larger radius than the curved portion 43 of the tube 31. This larger radius is made possible by the fact that the opening 20a in the junction box 20 is somewhat larger than the opening 21d in the switch box 21.

Figure 6:
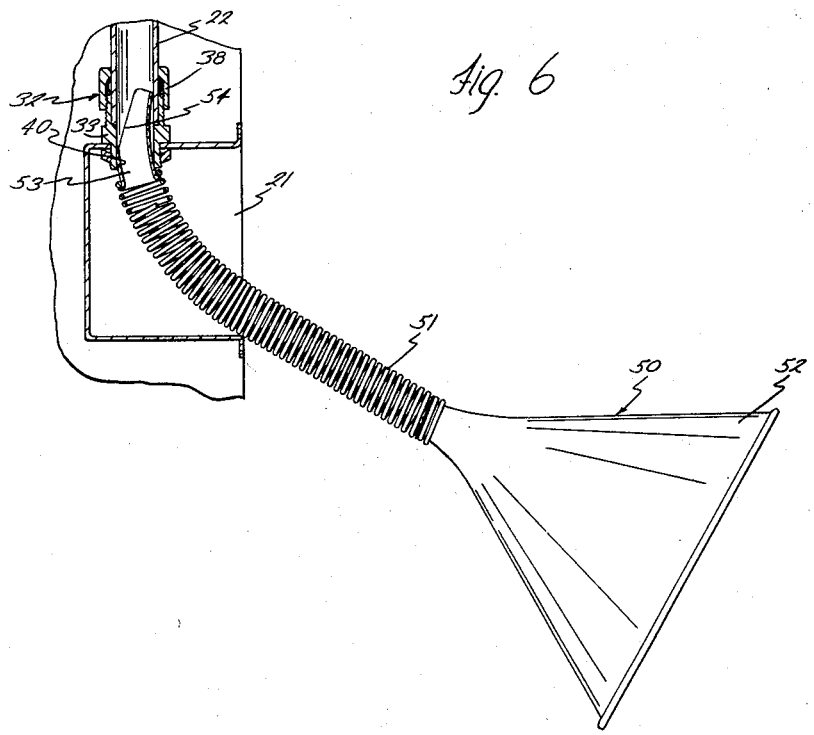
Figure 6 is a cross sectional view of an electrical connection box showing a modified feeding tube in place.

Figure 6 illustrates a slightly modified feeding tube 50 wherein a stiff spring 51 is utilized in place of the tube section 41 and curved portion 43. In this form of the invention the stiff spring 51 is provided at one end with a funnel 52 and at the other end with a short tubular tip 53. The funnel 52 and tip 53 are both inserted into the spring 51 and welded or otherwise fixed in place. The tip 53 is constructed in substantially the same manner as the end 44 of the feeding tube 31 in the main form of the invention and has a bevel 54 therein to provide a reduced tip for easy insertion of the feeding tube 50 into the conduit opening 40 of the connector 32. It will be noted that the tubular tip 53 is slightly curved as in the main form of the invention to provide a three point gripping contact with the conduit 22. The feeding tube 50 operates in the same manner as the tube 31 or 31' to guide wires into the conduit 22, the spring 51 providing a flexible tubular section connecting the flared end 52 and the tip 53. The spring section 51 provides the required flexibility to permit the feeding tube 50 to be inserted into any conduit opening inside a connection box with the outlet type such as box 21 or the junction type such as box 20.

Figure 7:
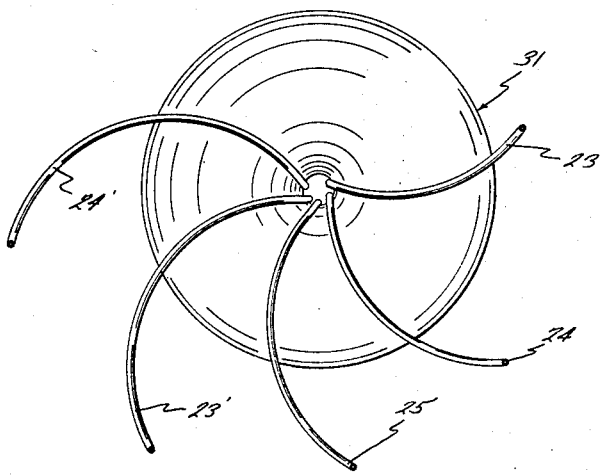
Figure 7 is a fragmentary view looking into the flared end of a feeding tube and illustrating the manner in which the wires are introduced into the feeding tube.

It should be apparent from the foregoing that my improved feeding tube 31, 31' or 50 is well adapted for use with any standard conduit and box combination. When the feeding tube is in place and the wires to be threaded are pulled therethrough, the enlarged flared portion 42, 42' or 52 operates to smooth kinks and bends from the wires, and to properly direct them into the tubular section 41, 41' or the spring 51 (see Figure 7). The novel construction of the end 44 or tip 53 allows the wires to enter the conduit without abrading against any sharp corners, and in fact due to the curvature of the tube 41 adjacent the end 44, positions the wires centrally of the end edges of the tube section 41 so that the wires actually touch nothing as they leave the end 44 of the feeding tube.

Since conventional conduit systems normally include conduit sections of three different diameters, namely ½ inch, ¾ inch and 1 inch, I have found it necessary to use three feeding tubes, one proportioned to fit each conduit size. Since more than three wires are required in some instances, I have also found it necessary to use two wire holding racks. In actual practice, I have found that an electrician equipped with the apparatus just described, can thread any conventional conduit system in substantially the same time as previously required by the heretofore accepted threading method requiring two electricians, with substantially more satisfactory results.

Having thus described my invention, I claim:

1. A wire feeding tube for guiding wires into conduit sections connected to electrical connection boxes comprising a tubular member having a small end of suitable size for insertion into a conduit section and a larger outwardly flared outer end, the tubular member being curved intermediate the ends whereby to position the axis of one end at an angle to the axis of the other end, the small end being bias cut from the tip to a point on the outside of the curved surface spaced endwise from the tip to provide a reduced tip for insertion into the conduit while the small end is angularly disposed with respect to the conduit, said bias cut also providing an enlarged end opening in said small end.

2. A guide for guiding wires as they are pulled into a conduit through a connection box comprising a curved tube having part of the material of the tube bias cut away along the outside of the curve from one end thereof to a point on the outside of the curved surface spaced endwise from said end to provide an open channel comprising a tip portion at said end insertable into the conduit, gripping means on said tube spaced from the tip portion, insertable in the conduit with said tip portion for yieldably engaging the inner surface of the conduit at a distance from said tip portion whereby to hold the tip portion in the conduit.

3. A guide for guiding wires as they are pulled into a conduit through a connection box comprising a curved tube having part of the material of the tube bias cut away along the outside of the curve from one end thereof to a point on the outside of the curved surface spaced endwise from said end to provide an open channel comprising a tip portion at said end insertable into the conduit, gripping means on said tube spaced from the tip portion, insertable in the conduit with said tip portion for yieldably engaging the inner surface of the conduit at a distance from said tip portion whereby to hold the tip portion in the conduit, said gripping means being diametrically opposite the tip portion on said tube.

References Cited in the file of this patent

UNITED STATES PATENTS

| | | |
|---|---|---|
| 2,258,745 | Dewey et al. | Oct. 14, 1941 |
| 2,260,430 | Blasingame | Oct. 28, 1941 |
| 2,515,724 | McCroskey | July 18, 1950 |
| 2,532,504 | Lapsley | Dec. 5, 1950 |
| 2,537,232 | Nottingham | Jan. 9, 1951 |
| 2,605,982 | Miller | Aug. 5, 1952 |
| 2,620,997 | Lyon | Dec. 9, 1952 |
| 2,628,042 | Fitts et al. | Feb. 10, 1953 |
| 2,665,147 | Wiesmann | Jan. 5, 1954 |
| 2,746,716 | Zachary | May 22, 1956 |